W. R. SCHWAB.
PHOTOGRAPHIC MATERIAL.
APPLICATION FILED FEB. 4, 1913.
1,141,012.
Patented May 25, 1915.
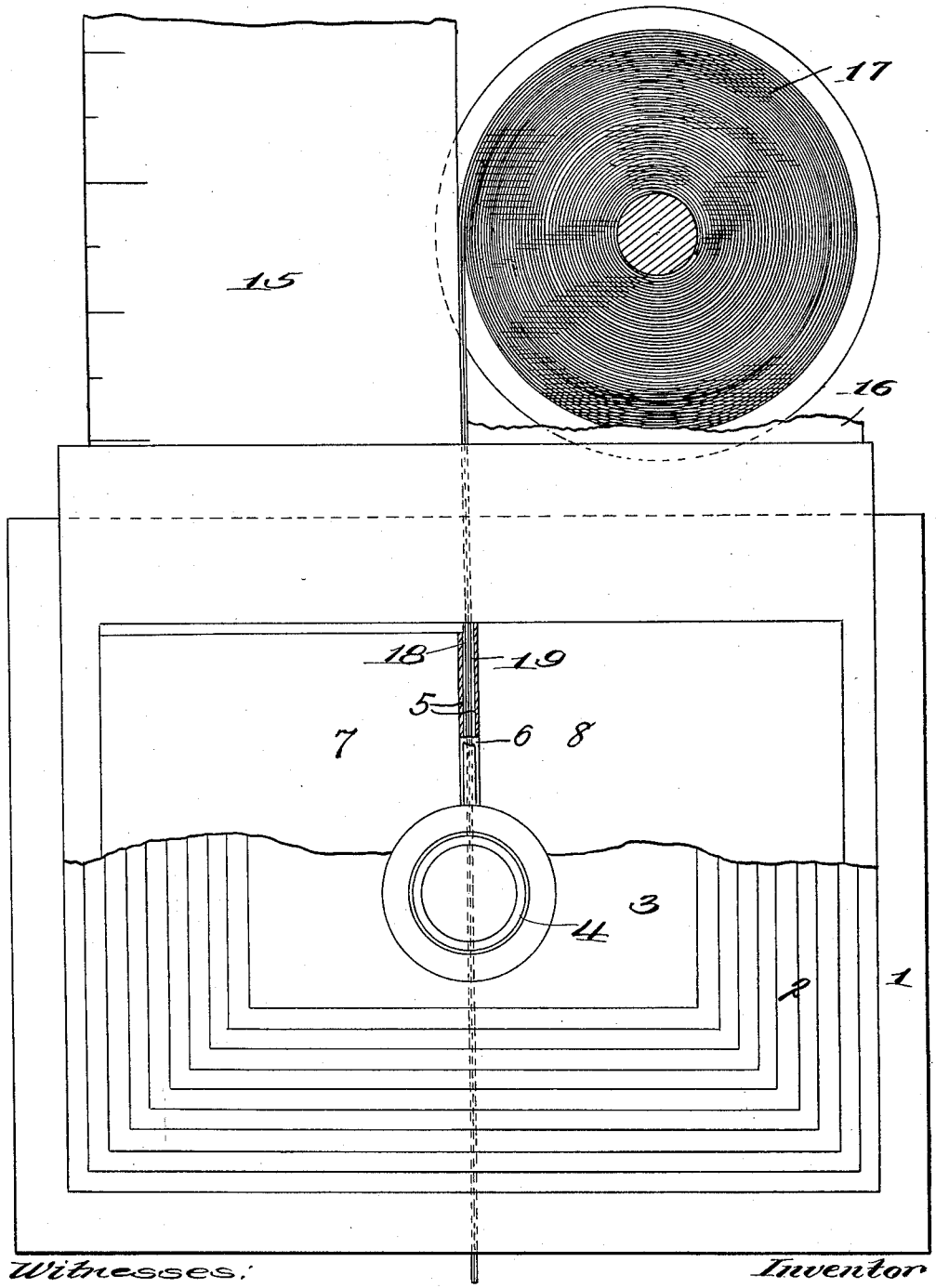

UNITED STATES PATENT OFFICE.

WILLIAM R. SCHWAB, OF KANSAS CITY, MISSOURI, ASSIGNOR TO THE CAMERAGRAPH COMPANY, OF KANSAS CITY, MISSOURI, A CORPORATION OF ARIZONA.

PHOTOGRAPHIC MATERIAL.

1,141,012.  Specification of Letters Patent.  Patented May 25, 1915.

Application filed February 4, 1913. Serial No. 746,248.

*To all whom it may concern:*

Be it known that I, WILLIAM R. SCHWAB, a citizen of the United States, residing at Kansas City, in the county of Jackson and State of Missouri, have invented new and useful Improvements in Photographic Material, of which the following is a specification.

The object of the present invention is to provide a roll of sensitized photographic paper or material adapted for use in connection with photographic apparatus and especially apparatus of the class adapted for the reproduction of books, documents and other records or objects. The roll, according to the present invention, is composed of two strips of paper or other flexible material wound together to form the roll, each strip being sensitized on one side and the plain or unsensitized sides of the two strips being adjacent or in contact. A roll of sensitized photographic material of this character is especially adapted for use in photographic apparatus of the character shown and described in my prior Patent, No. 1,003,300 granted September 12, 1911, it enabling such an apparatus to be operated to produce separate exposures of separate documents or objects on the two oppositely presented sensitized strips, enabling the separate reproductions thus produced to be handled or filed away separately.

In the accompanying drawing the figure is a front elevation, partly in section, of a camera showing a roll of photographic material embodying the present invention and illustrating the manner in which the same is to be used.

Similar parts are designated by the same reference characters in the view.

It is to be understood that a roll of sensitized material embodying the present invention is adapted for use generally in connection with photographic apparatus of various kinds. These rolls, however, are especially adapted for use in connection with photographic apparatus of the class shown and described in my prior patent aforesaid, and the roll is shown in connection with an apparatus of that class in the present instance. The construction and operation of such an apparatus is described in detail in said patent, and hence it will be sufficient to describe the same only in a general way in the present instance and to refer to the patent for a detailed description. The apparatus is shown diagrammatically, and it embodies a suitable casing 1, the bellows 2, and the lens front 3 carrying the lens 4, as will appear from said prior patent. A pair of transparent plates 5, such for example as glass, are supported within the casing 1, and a space between these plates provides a passageway for the sensitized material. Direct exposure of the sensitized material is prevented by a guard strip 6 which is attached to the forward edges of the two transparent plates. The light rays from the lens are reflected by a pair of mirrors 7 and 8 which are arranged at suitable angles at opposite sides of the plates 5 which position the photographic material in the focal plane of the lens. The mirrors or reflecting mediums are so placed with reference to the lens and the plates 5 that they project images from opposite directions and toward a common focal plane. A pair of shutters 15 and 16 are provided to control the size of the exposure openings or to completely cut off the light to one or another of the reflectors and thereby enable the operator to either adjust the size of the exposure to be made, according to the size of the document or object to be reproduced, or to produce the exposures alternately.

According to the present invention, a roll of sensitized material 17 is provided, this roll being composed of two strips 18 and 19 of flexible material, preferably paper, these strips having coatings 20 and 21 respectively of emulsions sensitive to light. The sensitized surfaces of the strips face in opposite directions whereby they will be positioned to receive the light rays from the reflectors 7 and 8 as the strips occupy a position between the transparent plates 5. The plain or unsensitized faces of the strips are arranged back to back and in contact. The sensitized strips are wound to form the roll and the roll may be contained in a suitable casing above the camera and any appropriate means may be provided for feeding the strips simultaneously and at appropriate intervals between the transparent plates.

A roll of photographic material embodying the present invention is particularly adapted for use in those cases where it is desired to make separate or unbound reproductions of documents, such, for example, as deeds, checks or the like, the exposing operation being greatly facilitated and expedited as both strips may be exposed simultaneously.

I claim as my invention:—

A roll of photographic material composed of two strips of flexible material, each strip being sensitized on one side, the strips being wound to form the roll and having their plain or unsensitized sides back to back.

In testimony whereof I have hereunto set my hand in presence of two subscribing witnesses.

WILLIAM R. SCHWAB.

Witnesses:
RUTH WHEELER,
A. S. PARK.

Copies of this patent may be obtained for five cents each, by addressing the "Commissioner of Patents, Washington, D. C."